(12) United States Patent
Matsumaru

(10) Patent No.: US 8,060,144 B2
(45) Date of Patent: Nov. 15, 2011

(54) WIRELESS COMMUNICATION SYSTEM BASE STATION APPARATUS, WIRELESS COMMUNICATION SYSTEM TERMINAL APPARATUS, WIRELESS COMMUNICATION SYSTEM, AND METHOD FOR CANCELING DIRECT LINK MODE

(75) Inventor: Makoto Matsumaru, Saitama (JP)

(73) Assignee: Pioneer Corporation, Tokyo (JP)

( * ) Notice: Subject to any disclaimer, the term of this patent is extended or adjusted under 35 U.S.C. 154(b) by 869 days.

(21) Appl. No.: 12/066,880

(22) PCT Filed: Sep. 14, 2006

(86) PCT No.: PCT/JP2006/318272
§ 371 (c)(1),
(2), (4) Date: Apr. 29, 2008

(87) PCT Pub. No.: WO2007/032438
PCT Pub. Date: Mar. 22, 2007

(65) Prior Publication Data
US 2009/0156224 A1    Jun. 18, 2009

(30) Foreign Application Priority Data

Sep. 15, 2005   (JP) .................................. 2005-268834

(51) Int. Cl.
*H04M 1/00* (2006.01)
*H04B 1/38* (2006.01)
(52) U.S. Cl. ......................... 455/561; 455/41.2; 455/446
(58) Field of Classification Search .......... 455/446–454, 455/41.1, 41.2, 561
See application file for complete search history.

(56) References Cited

U.S. PATENT DOCUMENTS 7,251,235 B2 *  7/2007 Wentink ........................ 370/338
2004/0240405 A1    12/2004 Okazaki

FOREIGN PATENT DOCUMENTS

JP    2004-363645 A    12/2004

OTHER PUBLICATIONS

Shiro Sakata, "Ubiquitous Technology, Wireless Communication LAN", Jun. 24, 2004, p. 165-166.
International Search Report of PCT/JP2006/318272, date of mailing Nov. 21, 2006.

* cited by examiner

*Primary Examiner* — Christian Hannon
(74) *Attorney, Agent, or Firm* — Young & Thompson

(57) ABSTRACT

In a wireless communication system (10), when a direct link mode is to be canceled, a station (200) generates a confirmation packet for confirming an unused band of the wireless communication system (10) and transmits the confirmation packet to an access point (100). At the access point (100), a band management part (130) determines the unused band, and a packet generating part (112) generates a response packet indicative of the unused band, which is then transmitted to the station (200). The station (200) determines, based on the unused band indicated by the response packet, whether the direct link mode should be canceled, and transmits a cancellation request packet to the access point (100) if the unused band is sufficient. At the access point (100), the direct link mode is switched to a normal mode for cancellation in response to the cancellation request packet.

11 Claims, 5 Drawing Sheets

[FIG. 1]
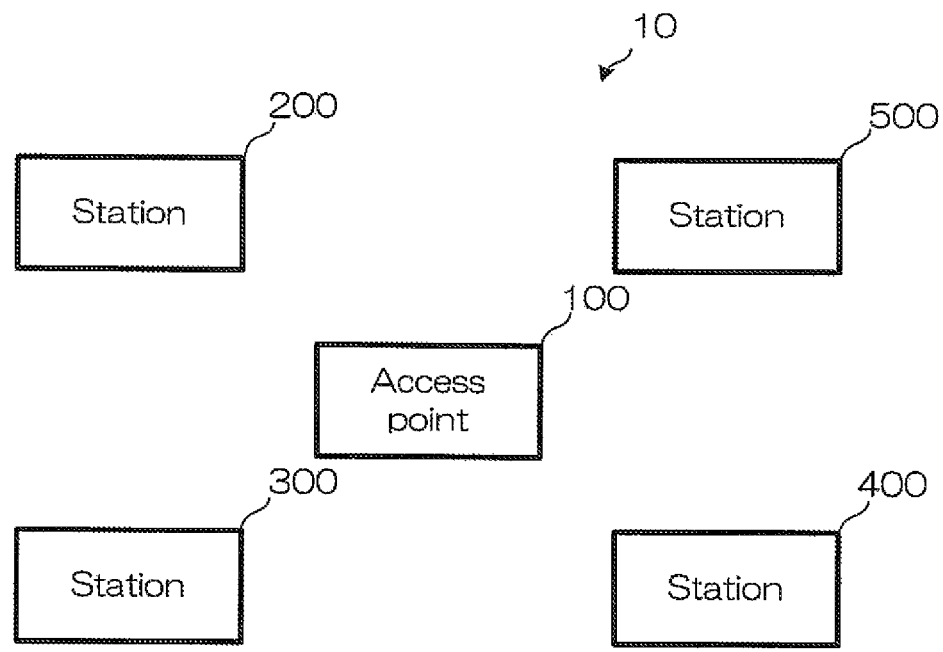
[FIG. 2]
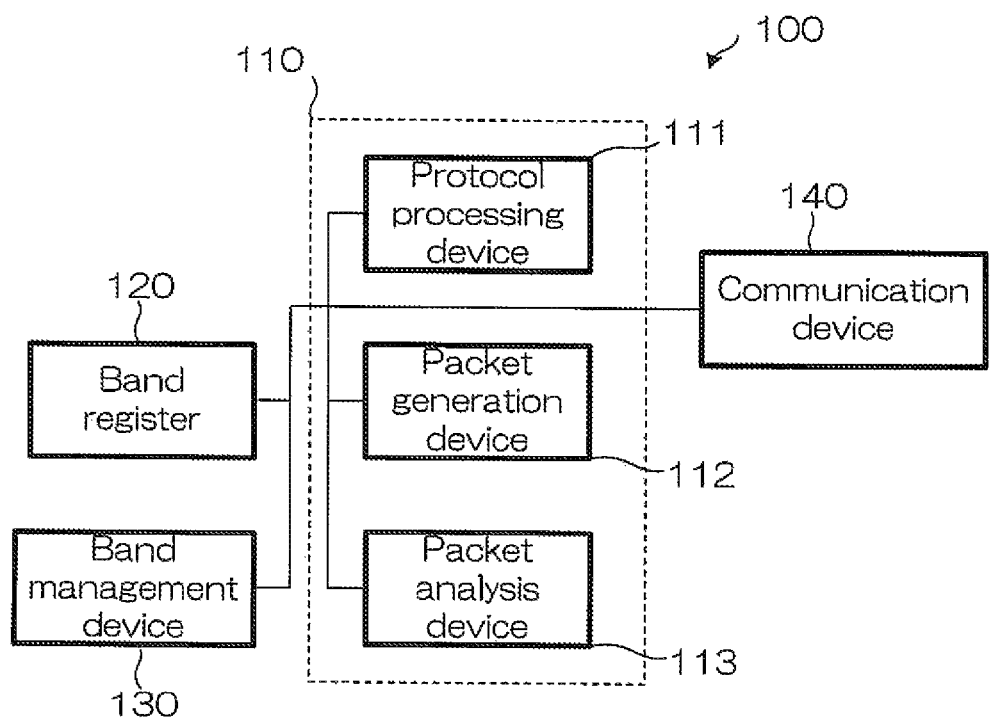

[FIG. 3]
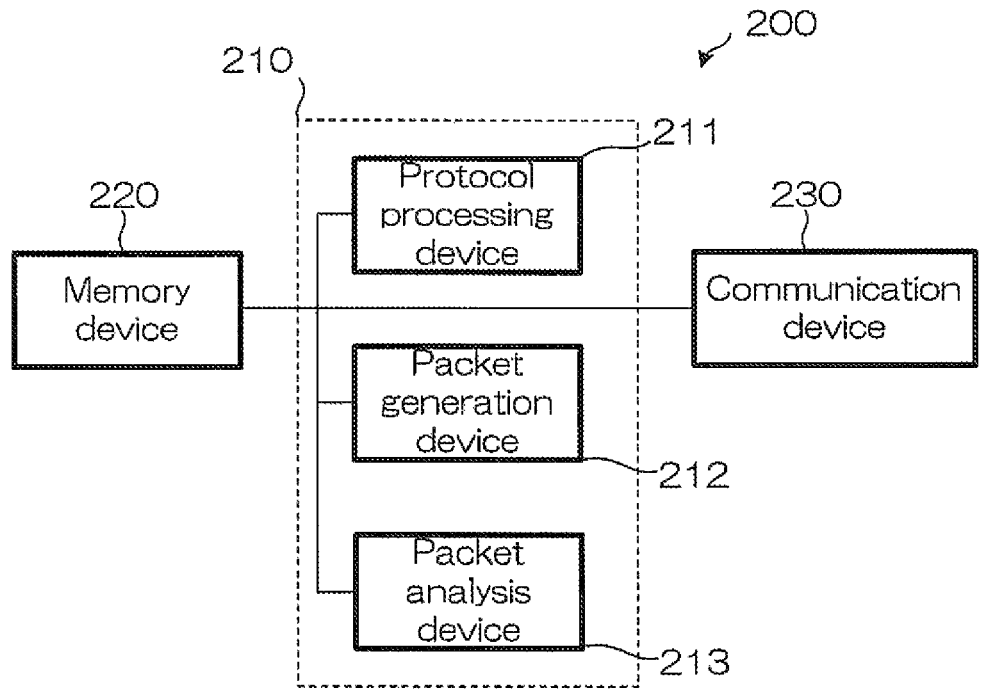
[FIG. 4]
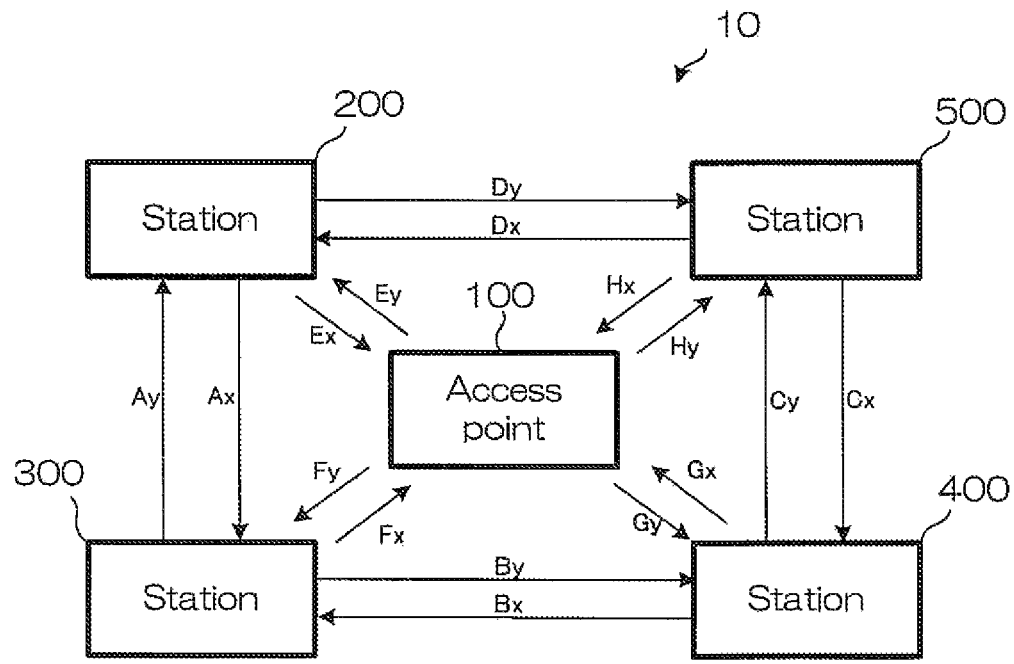

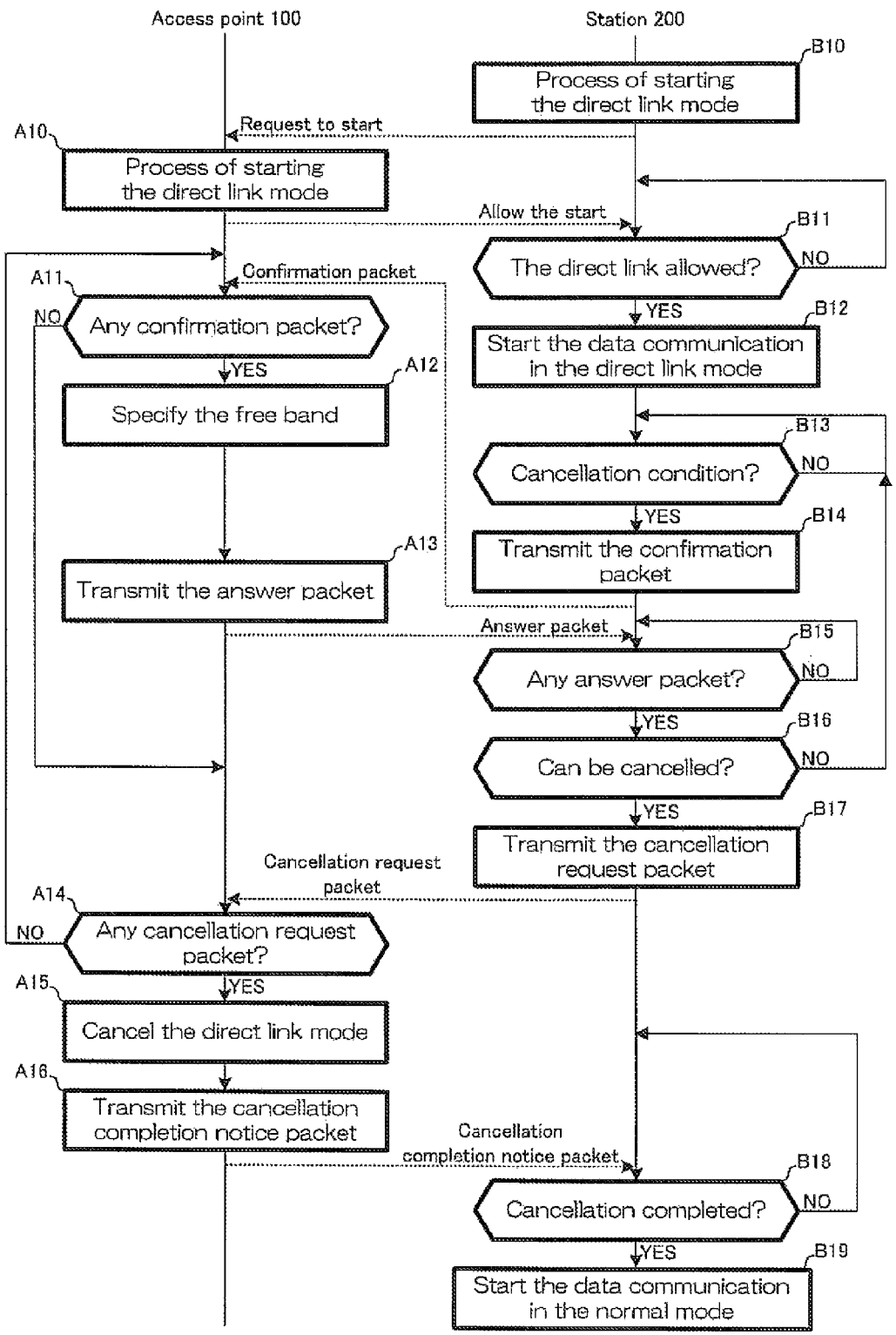
[FIG. 5]

[FIG. 6]
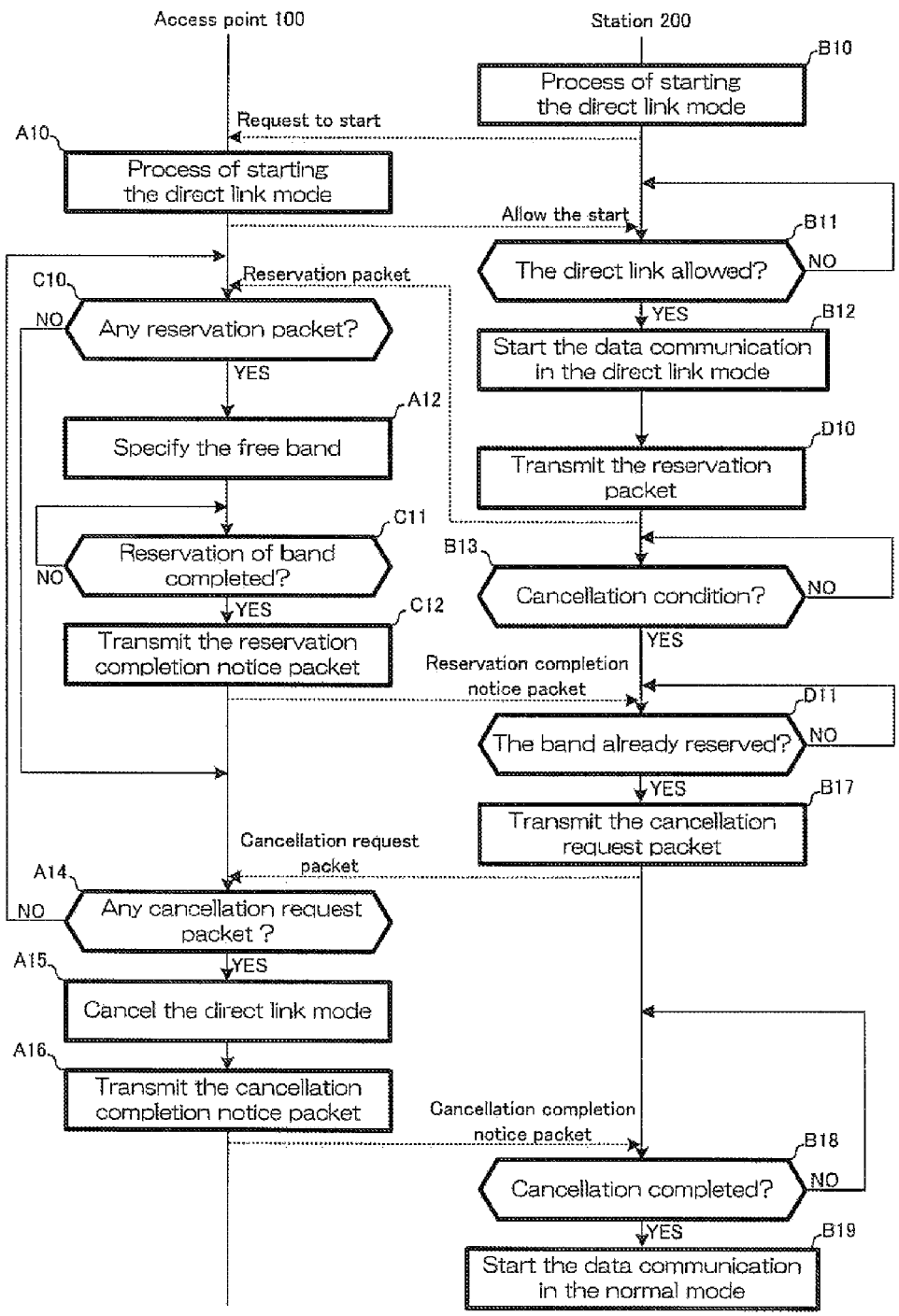

[FIG. 7]
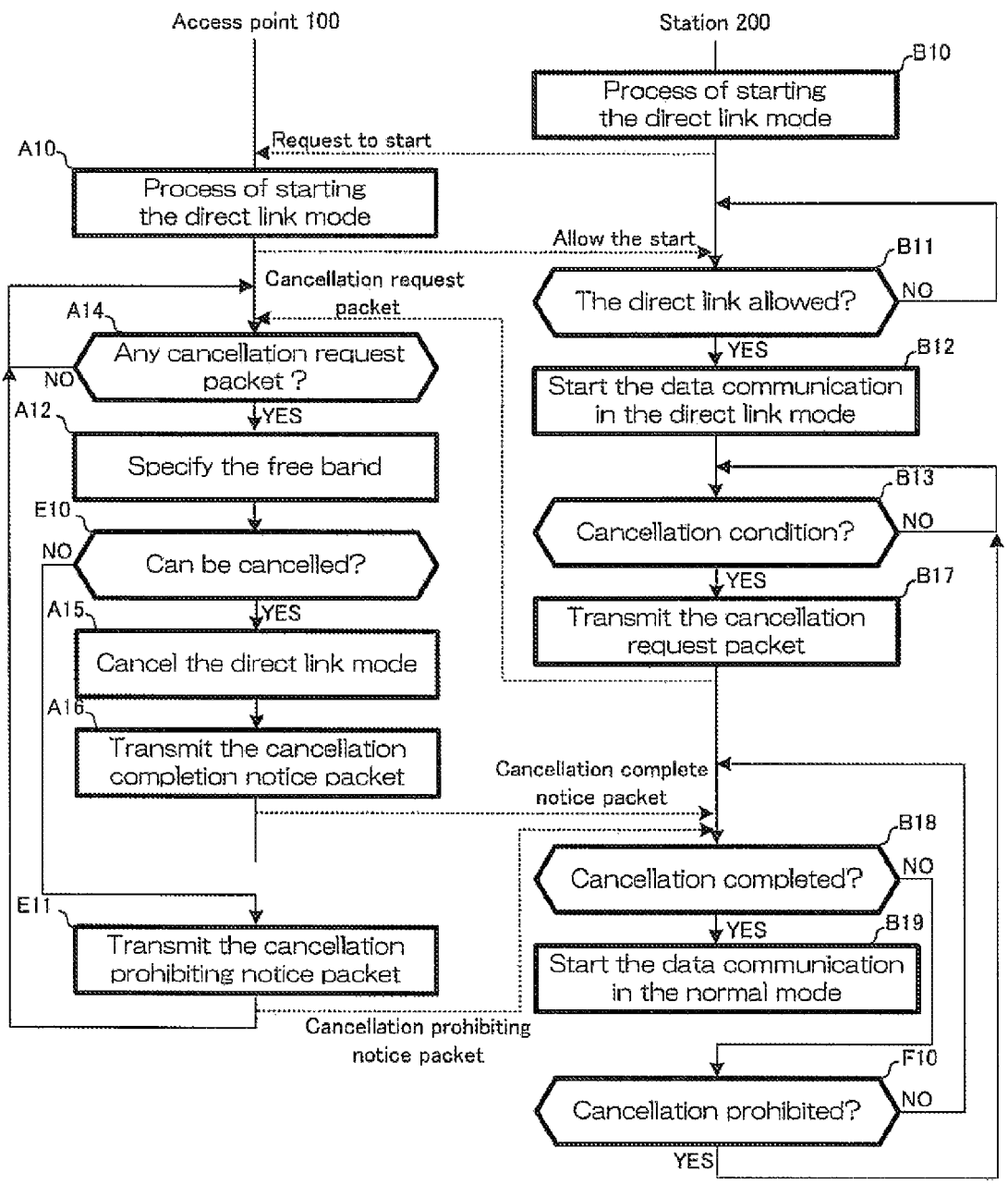

WIRELESS COMMUNICATION SYSTEM BASE STATION APPARATUS, WIRELESS COMMUNICATION SYSTEM TERMINAL APPARATUS, WIRELESS COMMUNICATION SYSTEM, AND METHOD FOR CANCELING DIRECT LINK MODE

TECHNICAL FIELD

The present invention relates to a base-station apparatus for a wireless communication system, a terminal apparatus for a wireless communication system, a wireless communication system, and a method of canceling a direct link mode, which is preferably used for those apparatuses and system.

BACKGROUND ART

As this type of wireless communication system, there is suggested a wireless LAN provided with a direct link mode (e.g. refer to a non-patent document 1).

According to the wireless LAN disclosed in the non-patent document 1 (hereinafter referred to a "conventional technology"), it allows preferable transmission of real-time data or the like, compared to data communication via an access point, by providing the direct link mode for direct data communication between a plurality of stations participating a network.
Non-patent document 1: Shiro SAKATA, "Ubiquitous Technology Wireless Communication LAN", Jun. 25, 2004, p. 165-166

DISCLOSURE OF INVENTION

Subject to be Solved by the Invention

During the use of the direct mode link, there is a need to stop it in some cases. In this case, the data targeted for transmission is transmitted by, for example, the normal data communication through the access point or the like. In performing the normal data communication through the access point, however, a larger communication band than that of the direct link mode is required. Thus, particularly if the transmission target is real-time data or the like, the normal data communication becomes complicated in some cases because of the lack of communication bands accompanied with the cancellation of the direct link mode. That is, the conventional technology has a technical problem of a difficulty in comfortably performing the data communication in the direct mode link.

In view of the aforementioned problem, it is therefore an object of the present invention to provide a base-station apparatus for a wireless communication system, a terminal apparatus for a wireless communication system, a wireless communication system, and a method of canceling a direct link mode, which allow the comfortable data communication in the direct link mode.

Means for Solving the Subject

<First Base-Station Apparatus for a Wireless Communication System>

The above object of the present invention can be achieved by a first base station apparatus for a wireless communication system, provided for a wireless communication system, which includes a plurality of terminal apparatuses capable of wirelessly performing data communication between the terminal apparatuses, which has a plurality of communication modes related to the data communication, and which includes a direct link mode (i) directly performed between the terminal apparatuses and (ii) having a required communication band smaller than that of another communication mode, as one of the communication modes, the base station apparatus provided with: a specifying device for specifying an available communication band from the communication band of the wireless communication system; a band information generating device for generating band information indicating the available communication band; a base-station-side wireless communicating device for transmitting the band information to at least one portion of the plurality of terminal apparatuses; and a cancelling device for cancelling the direct link mode by changing the direct link mode to the another communication mode in response to cancellation instruction information indicating to instruct the cancellation of the direct link mode, the direct link mode being associated with the terminal apparatus which is a transmission source of the cancellation instruction information, the cancellation instruction information being generated if a predetermined cancellation condition determined in advance as a condition to cancel the direct link mode is satisfied on each of the plurality of terminal apparatuses, the cancellation instruction information being transmitted through a terminal-side wireless communicating device provided for each of the terminal apparatuses.

The "wireless communication system" of the present invention indicates a system which includes at least the base station apparatus and the plurality of terminal apparatuses and which allows the wireless data communication between the plurality of terminal apparatuses, and it particularly indicates a system adapted to perform the data communication in the direct link mode between the plurality of terminal apparatuses.

Here, the "direct link mode" is a communication aspect or communication method which uses the communication band assigned by the base station apparatus between the terminal apparatuses and in which the data is directly exchanged without through the base station apparatus in execution timing controlled by the base station apparatus. The direct link mode conceptually includes a communication aspect or communication method which requires the smaller communication band for the data communication, than that of another communication mode provided for the wireless communication system of the present invention. In other words, in the wireless communication system of the present invention, there is at least another communication mode which requires the larger communication band than that of the direct link mode, except for the direct link mode. Moreover, the "direct link mode" of the present invention does not always indicate only the communication aspect or communication method referred to as the direct link mode. The communication aspect or communication method which ensures the aforementioned concept is within a scope of the "direct link mode" of the present invention.

The wireless communication system of the present invention provided with the direct link mode indicates "IEEE (Institute of Electrical and Electronics Engineers) 802.11e", which is the standard to a wireless LAN (Local Area Network), or the like.

Incidentally, in the wireless data communication, the band width of a frequency band used is equivalent to a data transmission rate (i.e. a data transmission amount per unit time). Therefore, the "communication band" of the present invention is not simply limited to the band width of the frequency band, and it conceptually includes even the data transmission rate.

According to the first base station apparatus for a wireless communication system (hereinafter referred to as a "base station apparatus" as occasion demands) of the present invention, in its operation, the direct link mode between the terminal apparatuses, which are cancellation targets, is cancelled by the cancelling device. At this time, the direct link mode is cancelled in response to the cancellation instruction information generated if the cancellation condition is satisfied on the terminal apparatus. Here, the "cancellation instruction information" is information indicating to instruct the cancellation of the direct link mode, and it may be information in an arbitrary form as long as the instruction on the cancellation of the direct link mode can be transmitted to the base station apparatus. Preferably, the cancellation instruction information has a form, such as a packet in the wireless LAN.

Now the "cancellation condition" may be any condition; however, preferably it may be a condition in which it can be determined or predicted that the quality of the data communication in the direct link mode, performed between the terminal apparatuses, cannot be sufficiently ensured, such as, for example, the case that no data is transmitted from the terminal apparatus which is a communication partner, within a time-out period specified in advance, and the case that errors frequently occur in the data transmission and reception. Alternatively, it may be the case that an entry is made indicating to request the man-made cancellation of the direct link mode through various input equipment, such as a keyboard, by a user who uses the terminal apparatus or the like. Incidentally, the expression "to cancel" means to change the direct link mode to the normal mode.

Here, in particular, the data communication in the direct link mode requires the smaller communication band than that of the data communication in the normal mode. Thus, if the direct link mode is cancelled by changing it to the normal mode, the required communication band increases. For example, in the communication system complying with IEEE802.11e, the data communication in the normal mode requires the communication band twice as large as that of the direct link mode. Here if the available communication band at that time point is insufficient in the wireless communication system, cancelling the direct link mode does not allow the normal data transmission, which is not preferable. Thus, the first base station apparatus of the present invention solves the problems as follows.

That is, according to the first base station apparatus of the present invention, in its operation, the available communication band is specified from the communication band of the wireless communication system. Here, the "available communication band" conceptually includes the communication band that is not used at that time point. The band information generating device generates the band information indicating the available communication band, and the generated band information is transmitted by the base-station-side wireless communicating device to at least one portion of the plurality of terminal apparatuses.

Therefore, in the terminal apparatus to which the band information is transmitted, if the data communication in the direct link mode is performed with another terminal apparatus, it can be judged whether or not to cancel the direct link mode on the basis of the band information. That is, regardless of the lack of the communication band, the situation in which the direct link mode is cancelled hardly occurs, so that it is possible to comfortably perform the data communication in the direct link mode.

Here, the expression "at least one portion" indicates that the band information may be not necessarily transmitted to all the terminal apparatuses included in the wireless communication system. That is, with or without the execution of the direct link mode at the current time point, the possibility at least reduces that the direct link mode is incompletely canceled (i.e. with the lack of the communication band) by transmitting the band information. In that sense, the terminal apparatus which is a transmission target of the band information is not necessarily limited. However, in the typical wireless communication system, for example, in the wireless communication system complying with IEEE802.11e described above, the communication band is managed by the base station apparatus, and the assignment of the communication band used for the data communication between the terminals or between each of the terminals and the base station apparatus is controlled by the base station apparatus. Therefore, in this case, it is possible to specify the terminal apparatus which is performing the data communication in the direct link mode at the current time point. In this case, the band information may be transmitted only to the terminal apparatus which is executing the direct link mode. Moreover, the band information may be transmitted at constant time intervals determined in advance, or the band information may be transmitted at time intervals randomly set. Alternatively, the band information may be transmitted in a form corresponding to a packet or the like which requires the band information.

In one aspect of the first base station apparatus of the present invention, wherein the base-station-side wireless communicating device transmits the band information to the terminal apparatus which is a transmission destination of notice request information in response to the notice request information indicating to request the notice of the available communication band, the notice request information being generated if the cancellation condition is satisfied on each of the plurality of terminal apparatuses, the notice request information being transmitted through the terminal-side wireless communicating device, and the cancelling device cancels the direct link mode related to the terminal apparatus which is a transmission source of cancel instruction information, in response to the cancel instruction information, which is transmitted through the terminal-side wireless communicating device if it is determined to cancel the direct link mode as a result of the judgment of whether or not to cancel the direct link mode, based on the band information on the terminal apparatus which is a transmission destination of the band information.

According to this aspect, the band information is transmitted to the terminal apparatus which is a transmission source of the notice request information generated and transmitted if the cancellation condition is satisfied on each of the terminals. For example, if the band information is transmitted as the packet, since the packet is also one portion of the transmission data, at least one portion of the communication band is also used. Therefore, as described above, the transmission of the band information when the band information is requested accelerates the efficient use of the communication band, which is effective.

Incidentally, in the terminal apparatus to which the band information is transmitted, it is determined whether or not to cancel the direct link mode on the basis of the band information. If it is determined to cancel the direct link mode, the aforementioned cancellation instruction information is transmitted to the base station apparatus. Therefore, according to this aspect, it is possible to cancel the direct link, mode efficiently and effectively, and it is possible to perform the data communication in the direct link mode, more comfortably.

<Second Base-Station Apparatus for a Wireless Communication System>

The above object of the present invention can be also achieved by a second base station apparatus for a wireless communication system, provided for a wireless communication system, which includes a plurality of terminal apparatuses capable of wirelessly performing data communication between the terminal apparatuses, which has a plurality of communication modes related to the data communication, and which includes a direct link mode (i) directly performed between the terminal apparatuses and (ii) having a required communication band smaller than that of another communication mode, as one of the communication modes, the base station apparatus provided with: a specifying device for specifying an available communication band from the communication band of the wireless communication system; a band reserving device for reserving a communication band for change from the available communication band in response to reservation request information indicating to request the reservation of the communication band for change required to change the direct link mode to the another communication mode, the reservation request information being generated if data communication in the direct link mode is performed on each of the plurality of terminal apparatuses, the reservation request information being transmitted through a terminal-side wireless communicating device provided for each of the terminal apparatuses; a reservation completion information generating device for generating reservation completion information indicating the communication band for change is reserved when the communication band for change is reserved; a base-station-side wireless communicating device for transmitting the reservation completion information to the terminal apparatus which is a transmission destination of the reservation completion information; and a cancelling device for cancelling the direct link mode by changing the direct link mode to the another communication mode by using the reserved communication band for change, in response to cancellation instruction information indicating to instruct the cancellation of the direct link mode, the cancellation instruction information being generated if a predetermined cancellation condition determined in advance as a condition to cancel the direct link mode is satisfied on the terminal apparatus which is a transmission destination of the reservation completion information, the cancellation instruction information transmitted through the terminal-side wireless communicating device.

According to the second base station apparatus of the present invention, the communication band for change, required to change the direct link mode to the another communication mode, is reserved by the band reserving device from the available communication band, which is specified by the same specifying device as that of the first base station apparatus.

Here, the communication band for change is a communication band twice as large as that of the direct link mode, with regard to the IEEE802.11e standard; however, it may be a communication band in which the direct link mode can be safely changed, i.e. a communication band in which it is already known or can be predicted that the defect or loss of the data caused by changing the communication mode will be no problem in practice. Incidentally, the communication band for change is reserved in response to the reservation request information generated and transmitted if the data communication in the direct link mode is performed, on the terminal apparatus which is performing the data communication in the direct link mode.

If the communication band for change is reserved, the reservation completion information indicating that the communication band for change is reserved is generated by the reservation completion information generating device, and it is transmitted to the terminal apparatus, which is a transmission source of the reservation completion information, through the base-station-side wireless communicating device.

The cancelling device changes the direct link mode to the another communication mode in response to the cancellation instruction information transmitted from the terminal apparatus, which is a transmission destination of the reservation completion information, to thereby cancel the direct link mode. As described above, according to the second base station apparatus of the present invention, by reserving the communication band for change in advance, it is possible to transmit the cancellation instruction information quickly if the cancellation condition is satisfied on the terminal apparatus side. Therefore, it is possible to comfortably perform the data communication in the direct link mode.

<Third Base-Station Apparatus for a Wireless Communication System>

The above object of the present invention can be also achieved by a third base station apparatus for a wireless communication system, provided for a wireless communication system, which includes a plurality of terminal apparatuses capable of wirelessly performing data communication between the terminal apparatuses, which has a plurality of communication modes related to the data communication, and which includes a direct link mode (i) directly performed between the terminal apparatuses and (ii) having a required communication band smaller than that of another communication mode, as one of the communication modes, the base station apparatus provided with: a specifying device for specifying an available communication band from the communication band of the wireless communication system; a base-station-side cancellation determining device for determining whether or not to cancel the direct link mode on the basis of the available communication band, in response to cancellation instruction information indicating to instruct the cancellation of the direct link mode, the cancellation instruction information being generated if a predetermined cancellation condition determined in advance as a condition to cancel the direct link mode is satisfied on each of the plurality of terminal apparatuses, the cancellation instruction information being transmitted through a terminal-side wireless communicating device provided for each of the terminal apparatuses; and a cancelling device for cancelling the direct link mode by changing the direct link mode to the another communication mode if it is determined to cancel the direct link mode.

According to the third base station apparatus of the present invention, the base-station-side cancellation determining device determines whether or not to cancel the direct link mode, in response to the aforementioned cancellation instruction information generated and transmitted if the cancellation condition is satisfied on each of the terminal apparatuses. At this time, the base-station-side cancellation determining device determines whether or not to cancel the direct link mode, on the basis of the available communication band specified by the specifying device. That is, in the third base station apparatus, as opposed to the aforementioned first base station apparatus, it is determined whether or not cancel the direct link mode on the base station apparatus side, and in the terminal apparatus, the cancellation instruction information is merely generated and transmitted if the cancellation condition is satisfied. Therefore, it is possible to determine whether or not the direct link mode can be cancelled (from the practical viewpoint), relatively highly accurately. That is, the data communication in the direct link mode can be comfortably performed.

In one aspect of the third base station apparatus of the present invention, it is further provided with: a cancellation prohibiting information generating device for generating cancellation prohibiting information indicating to prohibit the cancellation of the direct link mode if it is determined not to cancel the direct link mode by the base-station-side cancellation determining device; and a base-station-side wireless communicating device for transmitting the cancellation prohibiting information to the terminal apparatus which is a transmission source of the cancellation prohibiting information.

Considering that whether or not to cancel the direct link mode is determined on the base station apparatus side, if it is determined not to cancel the direct link mode, the situation can be predicted that the direct link mode is not cancelled although the cancellation instruction information is transmitted from the terminal apparatus. In this case, the process of the terminal apparatus likely becomes sluggish.

According to this aspect, if it is determined not to cancel the direct link mode, the cancellation prohibiting information indicating to prohibit the cancellation of the direct link mode is generated, and it is transmitted to the terminal apparatus, which is a transmission source of the cancellation instruction information, through the base-station-side wireless communicating device. Therefore, it is possible to recognize that the direct link mode cannot be cancelled on the terminal apparatus side, which reduces an influence on the data communication in execution.

<First Terminal Apparatus for a Wireless Communication System>

The above object of the present invention can be also achieved by first terminal apparatus for a wireless communication system, capable of wirelessly performing data communication between another terminal apparatus for a wireless communication system and being provided with the another terminal apparatus for a wireless communication system and a base station apparatus in a wireless communication system, which has a plurality of communication modes related to the data communication and which includes a direct link mode (i) directly performed between the terminal apparatuses and (ii) having a required communication band smaller than that of another communication mode, the base station apparatus capable of cancelling the direct link mode by changing the direct link mode to the another communication mode, the terminal apparatus provided with: a cancellation instruction information generating device for generating cancellation instruction information indicating to instruct the cancellation of the direct link mode if a predetermined cancellation condition determined in advance as a condition to cancel the direct link mode is satisfied; a terminal-side cancellation determining device for determining whether or not to cancel the direct link mode, on the basis of band information indicating an available communication band from the communication band of the wireless communication system, the band information being generated on the base station apparatus, the band information being transmitted through a base-station-side wireless communicating device provided for the base station apparatus; and a terminal-side wireless communicating device for transmitting the cancellation instruction information to the base station apparatus if the cancellation condition is satisfied and it is determined to cancel the direct link mode by the terminal-side cancellation determining device.

The first terminal apparatus for a wireless communication system of the present invention (hereinafter referred to as a "terminal apparatus" as occasion demands) is a terminal apparatus corresponding to the first base station apparatus of the present invention.

According to the first terminal apparatus, the cancellation instruction information is generated by the cancellation instruction information generating device if the cancellation condition is satisfied.

On the other hand, the terminal-side cancellation determining device determines whether or not to cancel the direct link mode on the basis of the aforementioned band information transmitted from the base station apparatus. The generated cancellation instruction information is transmitted to the base station apparatus through the terminal-side wireless communicating device if it is determined to cancel the direct link mode by the terminal-side cancellation determining device.

As described above, according to the first terminal apparatus of the present invention, it is determined whether or not to cancel the direct link mode on the basis of the available communication band in the wireless communication system. Thus, the cancellation of the direct link mode is prevented in the situation that the communication band is lacked, and it is possible to comfortably perform the data communication in the direct link mode. Moreover, at this time, whether or not to cancel the direct link mode is determined on the terminal apparatus side, which allows the cancellation of the direct link mode suitable for the state of each of the terminal apparatuses.

In one aspect of the first terminal apparatus for a wireless communication system of the present invention, the terminal apparatus is further provided with a notice request information generating device for generating notice request information indicating to request the notice of the available communication band if the cancellation condition is satisfied, the terminal-side wireless communicating device transmits the notice request information to the base station apparatus, and the terminal-side cancellation determining device determines whether or not to cancel the direct link mode on the basis of the band information transmitted through the base-station-side wireless communicating device from the base station apparatus in response to the notice request information.

According to this aspect, the notice request information is generated by the notice request information generating device if the cancellation condition is satisfied, and it is transmitted to the base station apparatus through the terminal-side wireless communicating device. Thus, the band information can be efficiently obtained, and if the condition for cancelling the direct link mode is satisfied, it can be certainly determined whether or not to cancel the direct link mode by the terminal-side cancellation determining device. Therefore, it is possible to perform the data communication in the direct link mode, more comfortably.

<Second Terminal Apparatus for a Wireless Communication System>

The above object of the present invention can be also achieved by a second terminal apparatus for a wireless communication system, capable of wirelessly performing data communication between another terminal apparatus for a wireless communication system and being provided with the another terminal apparatus for a wireless communication system and a base station apparatus in a wireless communication system, which has a plurality of communication modes related to the data communication and which includes a direct link mode (i) directly performed between the terminal apparatuses and (ii) having a required communication band smaller than that of another communication mode, the base station apparatus capable of cancelling the direct link mode by changing the direct link mode to the another communication mode, the terminal apparatus provided with: a reservation request information generating device for generating reservation request information indicating to request reservation of a communication band for change required to change the direct link mode to the another communication mode if the data communication is performed in the direct link mode; a terminal-side wireless communicating device for transmitting the reservation request information to the base station apparatus; and a cancellation instruction information generating device for generating cancellation instruction information indicating to instruct the cancellation of the direct link mode if a predetermined cancellation condition determined in advance as a condition to cancel the direct link mode is satisfied, the terminal-side wireless communicating device transmitting the reservation request information to the base station apparatus in accordance with reservation completion information indicating that the communication band for change is reserved, the reservation completion information being generated on the base station apparatus if the base station apparatus reserves the communication band for change from an available communication band of the communication band of the wireless communication system in response to the transmitted reservation request information, the reservation completion information being transmitted through a base-station-side wireless communicating device.

The second terminal apparatus of the present invention is a terminal apparatus corresponding to the second base station apparatus of the present invention, and in its operation, the aforementioned reservation request information is generated by the reservation request information generating device. Moreover, the generated reservation request information is transmitted to the base station apparatus by the terminal-side wireless communicating device.

Here, the expression that " . . . generated if the data communication in the direct link mode is performed" means that the reservation request information may be generated before the execution of the data communication, if it is known in advance that the data communication in the direct link mode is to be performed in the near future, in addition to the period that the data communication in the direct link mode is performed. Incidentally, in this case, because it is before the execution of the data communication in the direct link mode, it is not necessarily specified which extent of communication band is required as the communication band for change; however, the effect caused by the reservation of the communication band is not disturbed.

On the other hand, if the cancellation condition is satisfied on the terminal apparatus, the cancellation instruction information is generated. The generation of the cancellation instruction information itself may be performed independently of whether or not the reservation request information is generated and transmitted. However, the transmission of the cancellation instruction information is performed in response to the reservation completion information, which is transmitted if the base station apparatus reserves the communication band for change in response to the reservation request information.

As described above, according to the second terminal apparatus of the present invention, the cancellation instruction information is transmitted if the base station apparatus reserves the communication band for change. Thus, the cancellation of the direct link mode is prevented in the situation that the communication band is lacked, and it is possible to comfortably perform the data communication in the direct link mode.

<First Wireless Communication System>

The above object of the present invention can be also achieved by a first wireless communication system, including a base station apparatus and a plurality of terminal apparatuses capable of wirelessly performing data communication between the terminal apparatuses, having a plurality of communication modes in performing the data communication, and including a direct link mode (i) directly performed between the terminal apparatuses and (ii) having a required communication band smaller than that of another communication mode, as one of the communication modes, the base station apparatus provided with: a specifying device for specifying an available communication band from the communication band of the wireless communication system; a band information generating device for generating band information indicating the available communication band; and a base-station-side wireless communicating device for transmitting the band information to at least one portion of the plurality of terminal apparatuses, each of the plurality of terminal apparatuses provided with: a cancellation instruction information generating device for generating cancellation instruction information indicating to instruct the cancellation of the direct link mode if a predetermined cancellation condition determined in advance as a condition to cancel the direct link mode is satisfied; a terminal-side cancellation determining device for determining whether or not to cancel the direct link mode, on the basis of the transmitted band information; and a terminal-side wireless communicating device for transmitting the cancellation instruction information to the base station apparatus if the cancellation condition is satisfied and it is determined to cancel the direct link mode by the terminal-side cancellation determining device, the base station apparatus further provided with a cancelling device for cancelling the direct link mode by changing the direct link mode to the another communication mode in response to the transmitted cancellation instruction information, the direct link mode being associated with the terminal apparatus which is a transmission source of the cancellation instruction information.

According to the first wireless communication system of the present invention, it is possible to comfortably perform the data communication in the direct link mode by providing the aforementioned first base station apparatus of the present invention and the first terminal apparatus of the present invention.

<Second Wireless Communication System>

The above object of the present invention can be also achieved by a second wireless communication system, including a base station apparatus and a plurality of terminal apparatuses capable of wirelessly performing data communication between the terminal apparatuses, having a plurality of communication modes in performing the data communication, and including a direct link mode (i) directly performed between the terminal apparatuses and (ii) having a required communication band smaller than that of another communication mode, as one of the communication modes, each of the plurality of terminal apparatuses provided with: a reservation request information generating device for generating reservation request information indicating to request reservation of a communication band for change required to change the direct link mode to the another communication mode if the data communication is performed in the direct link mode; a terminal-side wireless communicating device for transmitting the reservation request information to the base station apparatus; and a cancellation instruction information generating device for generating cancellation instruction information indicating to instruct the cancellation of the direct link mode if a predetermined cancellation condition determined in advance as a condition to cancel the direct link mode is satisfied, the base station apparatus provided with: a specifying device for specifying an available communication band from the communication band of the wireless communication system; a band reserving device for reserving a communication band for change from the available communication band in response to the transmitted reservation request information; a reservation completion information generating device for generating reservation completion information indicating the communication band for change is reserved when the communication band for change is reserved; and a base-station-side wireless communicating device for transmitting the reservation completion information to the terminal apparatus which is a transmission destination of the reservation completion information, the terminal-side wireless communicating device transmitting the cancellation instruction information to the base station apparatus in response to the transmitted reservation completion information, the base station apparatus further provided with a cancelling device for cancelling the direct link mode by changing the direct link mode to the another communication mode by using the reserved communication band for change, in response to the transmitted cancellation instruction information.

According to the second wireless communication system of the present invention, it is possible to comfortably perform the data communication in the direct link mode by providing the aforementioned second base station apparatus of the present invention and the second terminal apparatus of the present invention.

<Third Wireless Communication System>

The above object of the present invention can be also achieved by a third wireless communication system, including a base station apparatus and a plurality of terminal apparatuses capable of wirelessly performing data communication between the terminal apparatuses, having a plurality of communication modes in performing the data communication, and including a direct link mode (i) directly performed between the terminal apparatuses and (ii) having a required communication band smaller than that of another communication mode, as one of the communication modes, each of the plurality of terminal apparatuses provided with: a cancellation instruction information generating device for generating cancellation instruction information indicating to instruct the cancellation of the direct link mode if a predetermined cancellation condition determined in advance as a condition to cancel the direct link mode is satisfied; and a terminal-side wireless communicating device for transmitting the cancellation instruction information to the base station apparatus, the base station apparatus provided with: a specifying device for specifying an available communication band from the communication band of the wireless communication system; a base-station-side cancellation determining device for determining whether or not to cancel the direct link mode on the basis of the available communication band, in response to the transmitted cancellation instruction information; a cancellation prohibiting information generating device for generating cancellation prohibiting information indicating to prohibit the cancellation of the direct link mode if it is determined not to cancel the direct link mode by the base-station-side cancellation determining device; a base-station-side wireless communicating device for transmitting the cancellation prohibiting information to the terminal apparatus which is a transmission source of the cancellation prohibiting information; and a cancelling device for cancelling the direct link mode by changing the direct link mode to the another communication mode if it is determined to cancel the direct link mode by the base-station-side cancellation determining device.

According to the third wireless communication system of the present invention, it is possible to comfortably perform the data communication in the direct link mode by providing the aforementioned third base station apparatus of the present invention.

Incidentally, if the cancellation prohibiting information is transmitted, the cancellation instruction information is considered to be rejected; however, in most cases, the cancellation condition remains satisfied. In this case, the fact remains that there is a need to cancel the direct link mode. Therefore, in the third wireless communication system, in the terminal apparatus which receives the cancellation prohibiting information, the generation and transmission of the cancellation instruction information may be repeated as long as the cancellation condition is satisfied. Even in this case, however, in order to avoid the occurrence of a semipermanent loop process, it may be stopped to request the cancellation of the direct link mode (i.e. transmission of the cancellation instruction information) if the cancellation prohibiting information is received a predetermined number of times within a predetermined time or in similar cases.

<First Method of Cancelling a Direct Link Mode>

The above object of the present invention can be also achieved by a first method of cancelling a direct link mode in a wireless communication system, including a base station apparatus and a plurality of terminal apparatuses capable of wirelessly performing data communication between the terminal apparatuses, having a plurality of communication modes in performing the data communication, and including the direct link mode (i) directly performed between the terminal apparatuses and (ii) having a required communication band smaller than that of another communication mode, as one of the communication modes, the method provided with, in the base station apparatus: a specifying process of specifying an available communication band from the communication band of the wireless communication system; a band information generating process of generating band information indicating the available communication band; and a first transmitting process of transmitting the band information to at least one portion of the plurality of terminal apparatuses, the method provided with, in each of the plurality of terminal apparatuses: a cancellation instruction information generating process of generating cancellation instruction information indicating to instruct the cancellation of the direct link mode if a predetermined cancellation condition determined in advance as a condition to cancel the direct link mode is satisfied; a terminal-side cancellation determining process of determining whether or not to cancel the direct link mode, on the basis of the transmitted band information; and a second transmitting process of transmitting the cancellation instruction information to the base station apparatus if the cancellation condition is satisfied and it is determined to cancel the direct link mode by the terminal-side cancellation determining process, the method further provided with, in the base station apparatus, a cancelling process of cancelling the direct link mode by changing the direct link mode to the another communication mode in response to the transmitted cancellation instruction information, the direct link mode being associated with the terminal apparatus which is a transmission source of the cancellation instruction information.

According to the first method of cancelling a direct link mode of the present invention, it is possible to comfortably perform the data communication in the direct link mode by the operation in each process corresponding to each device in the aforementioned first wireless communication system of the present invention.

<Second Method of Cancelling a Direct Link Mode>

The above object of the present invention can be also achieved by a second method of cancelling a direct link mode in a wireless communication system, including a base station apparatus and a plurality of terminal apparatuses capable of wirelessly performing data communication between the terminal apparatuses, having a plurality of communication modes in performing the data communication, and including the direct link mode (i) directly performed between the terminal apparatuses and (ii) having a required communication band smaller than that of another communication mode, as one of the communication modes, the method provided with, in each of the plurality of terminal apparatuses: a reservation request information generating process of generating reservation request information indicating to request reservation of a communication band for change required to change the direct link mode to the another communication mode if the data communication is performed in the direct link mode; a first transmitting process of transmitting the reservation request information to the base station apparatus; and a cancellation instruction information generating process of generating cancellation instruction information indicating to instruct the cancellation of the direct link mode if a predetermined cancellation condition determined in advance as a condition to cancel the direct link mode is satisfied, the method provided with, in the base station apparatus: a specifying process of specifying an available communication band from the communication band of the wireless communication system; a band reserving process of reserving a communication band for change from the available communication band in response to the transmitted reservation request information; a reservation completion information generating process of generating reservation completion information indicating the communication band for change is reserved when the communication band for change is reserved; and a second transmitting process of transmitting the reservation completion information to the terminal apparatus which is a transmission destination of the reservation completion information, the method further provided with, in the terminal apparatus, a third transmitting process of transmitting the cancellation instruction information to the base station apparatus in response to the transmitted reservation completion information, the method further provided with, in the base station apparatus, a cancelling process of cancelling the direct link mode by changing the direct link mode to the another communication mode by using the reserved communication band for change, in response to the transmitted cancellation instruction information.

According to the second method of cancelling a direct link mode of the present invention, it is possible to comfortably perform the data communication in the direct link mode by the operation in each process corresponding to each device in the aforementioned second wireless communication system of the present invention.

<Third Method of Cancelling a Direct Link Mode>

The above object of the present invention can be also achieved by a third method of cancelling a direct link mode in a wireless communication system, including a base station apparatus and a plurality of terminal apparatuses capable of wirelessly performing data communication between the terminal apparatuses, having a plurality of communication modes in performing the data communication, and including the direct link mode (i) directly performed between the terminal apparatuses and (ii) having a required communication band smaller than that of another communication mode, as one of the communication modes, the method provided with, in each of the plurality of terminal apparatuses: a cancellation instruction information generating process of generating cancellation instruction information indicating to instruct the cancellation of the direct link mode if a predetermined cancellation condition determined in advance as a condition to cancel the direct link mode is satisfied; and a first transmitting process of transmitting the cancellation instruction information to the base station apparatus, the method provided with, in the base station apparatus: a specifying process of specifying an available communication band from the communication band of the wireless communication system; a base-station-side cancellation determining process of determining whether or not to cancel the direct link mode on the basis of the available communication band, in response to the transmitted cancellation instruction information; a cancellation prohibiting information generating process of generating cancellation prohibiting information indicating to prohibit the cancellation of the direct link mode if it is determined not to cancel the direct link mode by the base-station-side cancellation determining process; a second transmitting process of transmitting the cancellation prohibiting information to the terminal apparatus which is a transmission source of the cancellation prohibiting information; and a cancelling process of cancelling the direct link mode by changing the direct link mode to the another communication mode if it is determined to cancel the direct link mode by the base-station-side cancellation determining process.

According to the third method of cancelling a direct link mode of the present invention, it is possible to comfortably perform the data communication in the direct link mode by the operation in each process corresponding to each device in the aforementioned third wireless communication system of the present invention.

As explained above, according to the first base station apparatus of the present invention, it is provided with the specifying device, the band information generating device, the base-station-side wireless communicating device, and the cancelling device. Thus, it is possible to comfortably perform the data communication in the direct link mode.

As explained above, according to the second base station apparatus of the present invention, it is provided with the specifying device, the band reserving device, the reservation completion information generating device, the base-station-side wireless communicating device, and the cancelling device. Thus, it is possible to comfortably perform the data communication in the direct link mode.

As explained above, according to the third base station apparatus of the present invention, it is provided with the specifying device, the base-station-side cancellation determining device, and the cancelling device. Thus, it is possible to comfortably perform the data communication in the direct link mode.

As explained above, according to the first terminal apparatus of the present invention, it is provided with the cancellation instruction information generating device, the terminal-side cancellation determining device, and the terminal-side wireless communicating device. Thus, it is possible to comfortably perform the data communication in the direct link mode.

As explained above, according to the second terminal apparatus of the present invention, it is provided with the reservation request information generating device, the terminal-side wireless communicating device, and the cancellation instruction information generating device. Thus, it is possible to comfortably perform the data communication in the direct link mode.

As explained above, according to the first wireless communication system of the present invention, the base station apparatus is provided with the specifying device, the band information generating device, the base-station-side wireless communicating device, the cancellation instruction information generating device, the terminal-side cancellation determining device, the terminal-side wireless communicating device and the cancelling device, and the terminal apparatus is provided with the cancellation instruction information generating device, the terminal-side cancellation determining device, and the terminal-side wireless communicating device. Thus, it is possible to comfortably perform the data communication in the direct link mode.

As explained above, according to the second wireless communication system of the present invention, the terminal apparatus is provided with the reservation request information generating device, the terminal-side wireless communicating device, and the cancellation instruction information generating device, and the base station apparatus is provided with the specifying device, the band reserving device, the reservation completion information generating device, the base-station-side wireless communicating device, and the cancelling device. Thus, it is possible to comfortably perform the data communication in the direct link mode.

As explained above, according to the third wireless communication system of the present invention, the terminal apparatus is provided with the cancellation instruction information generating device and the terminal-side wireless communicating device, and the base station apparatus is provided with the specifying device, the base-station-side cancellation determining device, the cancellation prohibiting information generating device, the base-station-side wireless communicating device, and the cancelling device. Thus, it is possible to comfortably perform the data communication in the direct link mode.

As explained above, according to the first method of cancelling the direct link mode of the present invention, it is provided, in the base station apparatus, with the specifying process, the band information generating process, the first transmitting process, and the cancelling process, and it is provided, in each of the terminal apparatuses, with the cancellation instruction information generating process, the terminal-side cancellation determining process, and the second transmitting process. Thus, it is possible to comfortably perform the data communication in the direct link mode.

As explained above, according to the second method of cancelling the direct link mode of the present invention, it is provided, in the terminal apparatus, with the reservation request information generating process, the first transmitting process, and the cancellation instruction information generating process, and it is provided, in the base station apparatus, with the specifying process, the band reserving process, the reservation completion information generating process, the second transmitting process, and the cancelling process. Thus, it is possible to comfortably perform the data communication in the direct link mode.

As explained above, according to the third method of cancelling the direct link mode of the present invention, it is provided, in the terminal apparatus, with the cancellation instruction information generating process and the first transmitting process, and it is provided, in the base station apparatus, with the specifying process, the base-station-side cancellation determining process, the cancellation prohibiting information generating process, the second transmitting process, and the cancelling process. Thus, it is possible to comfortably perform the data communication in the direct link mode.

These effects and other advantages of the present invention will become more apparent from the following embodiments.

BRIEF DESCRIPTION OF DRAWINGS

FIG. 1 is a conceptual view showing a wireless communication system in a first embodiment of the present invention.

FIG. 2 is a block diagram showing an access point provided for the wireless communication system in FIG. 1.

FIG. 3 is a block diagram showing a station provided for the wireless communication system in FIG. 1.

FIG. 4 is a schematic diagram showing a data flow in the wireless communication system in FIG. 1.

FIG. 5 is a timing chart showing a flow of operations from the start to the end of a direct link mode, with regard to the access point and the station in the wireless communication system in FIG. 1.

FIG. 6 is a timing chart showing a flow of operations from the start to the end of a direct link mode, in a second embodiment of the present invention.

FIG. 7 is a timing chart showing a flow of operations from the start to the end of a direct link mode, in a third embodiment of the present invention.

DESCRIPTION OF REFERENCE CODES

10 . . . wireless communication system, 100 . . . access point, 110 . . . processor device, 111 . . . protocol processing device, 112 . . . packet generation device, 113 . . . packet analysis device, 120 . . . band register, 130 . . . band management device, 140 . . . communication device, 200 . . . station, 210 . . . processor device, 211 . . . protocol processing device, 212 . . . packet generation device, 213 . . . packet analysis device, 220 . . . memory device, 230 . . . communication device, 300, 400, 500 . . . station

BEST MODE FOR CARRYING OUT THE INVENTION

Hereinafter, the best mode for carrying out the present invention will be explained in each embodiment in order with reference to the drawings.

First Embodiment

Structure of Embodiment

Firstly, with reference to FIG. 1, the structure of a wireless communication system in a first embodiment of the present invention will be explained. FIG. 1 is a conceptual view showing a wireless communication system 10.

In FIG. 1, the wireless communication system 10 is a wireless LAN system complying with the IEEE 802.11e standard. The wireless communication system 10 is provided with: an access point 100; a station 200; a station 300; a station 400; and a station 500, and it is one example of the "wireless communication system" of the present invention. In the wireless communication system 10, each station is set within a communication range of the access point 100.

Next, with reference to FIG. 2, the detailed structure of the access point 100 will be explained. FIG. 2 is a block diagram showing the access point 100. Incidentally, in FIG. 2, the same points as those in FIG. 1 carry the same numerical references and the explanation thereof will be omitted.

In FIG. 2, the access point 100 is a control station for controlling the progress of data communication performed in the wireless communication system 10, and it is one example of the "base station apparatus for the wireless communication system" of the present invention. The access point 100 is provided with: a processor device 110; a band register 120; a band management device 130; and a communication device 140.

The processor device 110 is a control unit, including an arithmetic processing unit, such as a CPU (Central Processing Unit), for controlling the entire operation of the access point 100. The processor device 110 has a plurality of function blocks, including a protocol processing device 111, a packet generation device 112, and a packet analysis device 113, and it is realized by executing a program stored in a not-illustrated ROM (Read Only Memory) or a program externally inputted.

The protocol processing device 111 is a function block adapted to set various protocols corresponding to respective various communication modes described later. Incidentally, the protocol processing device 111 is one example of the "cancelling device" of the present invention.

The packet generation device 112 is a function block adapted to generate various packets transmitted to each station, and it functions as one example of the "band information generating device" of the present invention.

The packet analysis device 113 is a function block adapted to analyze the content of the various packets transmitted from each station.

The band register 120 is a memory element holding data which represents a communication band used in the wireless communication system 10.

The band management device 130 is a processing unit adapted to assign a communication band to each of the data communications performed in the wireless communication system within a range of the communication band allowed in advance in the wireless communication system 10, and adapted to manage the communication band in use. Incidentally, the band management device 130 is one example of the "specifying device" of the present invention.

The communication device 140 is adapted to transmit data which is a transmission target, to each station by using a wireless band and to receive the data transmitted from each station by using the wireless band. The communication device 140 is one example of the "base-station-side wireless communicating device" of the present invention.

Next, with reference to FIG. 3, the detailed structure of the station 200 will be explained. FIG. 3 is a block diagram showing the station 200. Incidentally, in FIG. 3, the same points as those in FIG. 1 carry the same numerical references and the explanation thereof will be omitted. Moreover, the station 200 has mutually the same hardware structure as those of the stations 300, 400, and 500. The explanation of the station 200 is shared with the structures of the other stations.

In FIG. 3, the station 200 is provided with: a processor device 210; a memory device 220; and a communication device 230, and it is one example of the "terminal apparatus for a wireless communication system" of the present invention. The station 200 employs various aspects accessible to the access point 100 in a wireless LAN method, such as a personal computer, a PDA, a mobile phone, a portable AV viewer player, a car navigation apparatus, and a car multimedia system.

The processor device 210 is a control unit, including an arithmetic processing unit, such as a CPU (Central Processing Unit), for controlling the entire operation of the station 200. The processor device 210 has a plurality of function blocks, including a protocol processing device 211, a packet generation device 212, and a packet analysis device 213, and realized by executing a program stored in a not-illustrated ROM (Read Only Memory) or a program externally inputted.

The protocol processing device 211 is a function block adapted to set various protocols corresponding to respective various communication modes described later. Incidentally, the protocol processing device 211 is one example of the "terminal-side cancellation determining device" of the present invention.

The packet generation device 212 is a function block adapted to generate various packets transmitted to each station, and it functions as one example of the "notice request information generating device" and the "cancellation instruction information generating device" of the present invention.

The memory device 220 is a memory device for storing various data, such as image data, video data, and audio data, to be transmitted to each station. The memory device 220 is in the form of a magnetic recording medium, such as a HD (Hard Disk), and an optical information recording medium, such as a DVD and a BD (Blu-ray Disc).

The communication device 230 is adapted to transmit data which is a transmission target, to the access point 100 or each station by using a wireless band and to receive the data transmitted from the access point 100 or each station by using the wireless band. The communication device 140 is one example of the "terminal-side wireless communicating device" of the present invention.

Operation of Embodiment

<Overview of Operation of Wireless Communication System>

Next with reference to FIG. 4, the overview of the operation of the wireless communication system 10 will be explained. FIG. 4 is a schematic diagram showing a data flow in the wireless communication system in FIG. 1. Incidentally, in FIG. 4, the same points as those in FIG. 1 carry the same numerical references and the explanation thereof will be omitted.

In FIG. 4, the wireless communication system 10 is adapted for the data communication between the stations. The wireless communication system 10 is provided with two types of communication modes, i.e. a normal mode and a direct link mode, as the communication mode of the data communication.

The normal mode is a communication mode in which the data communication is performed through the access point 100 between the stations. That is, in this case, it can cause a data flow directed to the access point 100 from each station (refer to illustrated arrows Ex, Fx, Gx, and Hx) and a data flow directed to each station from the access point 100 (refer to illustrated arrows Ey, Fy, Gy, and Hy). For example, if the data communication is performed between the station 200 and the station 500 in the normal mode, that causes a data flow sequentially streaming through the illustrated arrows Ex, Hy, Hx, and Ey (or Hx, Ey, Ex, and Hy).

On the other hand, the direct link mode is a communication mode in which the data communication is directly performed without through the access point 100 between the stations. In this case, it can cause a data flow between the stations (e.g. refer to illustrated arrows Ax, Ay, Bx, By, Cx, Cy, Dx, and Dy). Incidentally, in FIG. 4, the illustration of data flow between the stations located diagonally to each other (i.e. between the stations 200 and 400, and between the stations 300 and 500) is omitted in order to avoid complication.

Incidentally, in any communication modes, the timing of the data transmission in each station, the assignment of the communication band to each data communication, and the like are controlled by the access point 100.

Now in comparing the communication bands required in the execution of the respective communication modes by using the same data, the data communication in the normal mode requires a communication band twice as large as that of the direct link mode. Therefore, ideally, changing the normal mode to the direct link mode does not cause a problem in terms of the communication band. In contrast, changing the direct link mode to the normal mode possibly deteriorates the quality of the data communication because the direct link mode cannot be normally canceled depending on the status of use of the communication band in the wireless communication system 10. Thus, the wireless communication system 10 cancels the direct mode link in the following manner.

<Method of Cancelling Direct Link Mode>

Now with reference to FIG. 5, an explanation will be given on a method of cancelling a direct link mode in the embodiment. FIG. 5 is a timing chart showing a flow of operations from the start to the end of the direct link mode, with regard to the access point 100 and the station 200. Incidentally, here, it is assumed that the data communication is performed in the direct link mode between the station 200 and the station 300.

In FIG. 5, the station 200 starts a process of starting the direct link mode (step B10). That is, the protocol setting about the direct link mode is started by the protocol processing device 211. At this time, a start request frame is generated, including a MAC (Medium Access Control) address of the station 200, ability information, a MAC address of the station 300, which is a communication partner, a time-out period, and the like. The generated start request frame is transmitted to the access point 100 through the communication device 230.

On the other hand, in the access point 100, the start request frame is received through the communication device 140, and the process of starting the direct link mode by the protocol processing device 111 is performed (step A10). In the starting process, firstly, the protocol processing device 111 firstly determines whether or not the data communication can be performed in the direct link mode between the stations. Incidentally, in the embodiment, it is assumed that the data communication in the direct link mode is allowed, in view of the content of explanation of the method of cancelling the direct link mode.

The protocol processing device 111 transmits the start request frame to the station 300 that the station 200 desires as the communication partner, through the communication device 140. In response to the start request frame, a start allowance frame is transmitted, including the MAC address of the station 300 and the ability information, from the station 300.

If the start allowance frame is received through the communication device 140, the protocol processing device 111 transmits the start allowance frame to the station 200.

On the other hand, in the station 200, the protocol processing device 211 judges whether or not the data communication in the direct link mode is allowed after the transmission of the start request frame (step B11). If the start request frame is not received yet (the step S11: NO), the step B22 is repeated. If the start request frame is received through the communication device 230 (the step S11: YES), the data communication in the direct link mode is started with the station 300 (step S12). Incidentally, in the data communication in the direct link mode, for example, the data which is a communication target to be stored in the memory device 220 is converted to a data packet by the packet generation device 212 and is transmitted through the communication device 230.

At this time, the band management device 130 of the access point 100 refers to the band register 120, to thereby assign the communication band to the data communication in the direct link mode from the communication band which is unused at that time point (hereinafter referred to a "free band" as occasion demands) of the communication band of the wireless communication system 10, and it uses the assigned communication band to perform the data communication in the direct link mode between the stations.

During the data communication in the direct link mode, the protocol processing device 211 of the station 200 judges whether or not a cancellation condition is satisfied (step B13). Here, the cancellation condition is a condition determined in advance to change the direct link mode to the normal mode, and it indicates, for example, the case that the data packet is not transmitted from the station 300 within the time-out period determined in the starting process. One of the reasons that such a situation occurs is thought to be, for example, the deterioration of the communication quality caused by an increase in the communication distance between the station 200 and the station 300. Incidentally, considering that the data communication in the direct link mode is performed between the station 200 and the station 300, the processes after the step B12 in the station 200 are considered to be performed in the station 300 as well; however, the explanation of the operation on the station 300 side is omitted for simplification of explanation.

If the cancellation condition is not satisfied (the step B13: NO), the process related to the step S13 is repeated, and the data communication in the direct link mode is continued. On the other hand, if the cancellation condition is satisfied (the step B13: YES), the packet generation device 212 generates a confirmation packet indicating to request the notice of the free band of the wireless communication system 10 (i.e. one example of the "notice request information" of the present invention). The generated confirmation packet is transmitted to the access point 100 through the communication device 230 (step B14).

On the other hand, in the access point 100, the various packets received through the communication device 140 are transferred to the packet analysis device 113 as needed and are analyzed. The packet analysis device 113 judges whether or not there is the conformation packet in the received packets (step A11).

If there is the conformation packets (the step A11: YES), the band management device 130 refers to the band register 120 and specifies the free band (step A12). If the free band is specified, the packet generation device 112 generates an answer packet indicating the free band and transmits it to the station 200 through the communication device 140 (step A13).

In the access point 100, if it is judged that there is no confirmation packet (the step A11: NO), the packet analysis device 113 judges whether or not there is a cancellation request packet described later (step A14). If there is no cancellation request packet, the process is returned to the step A11 again to judge the presence or absence of the confirmation packet. That is, if the data communication in the direct link mode is started between the station 200 and the station 300, the presence or absence of the confirmation packet and the cancellation request packet is monitored with regard to the data communication in the access point 100.

In the station 200, as in the access point 100, the packets received through the communication device 230 are analyzed by the packet analysis device 213 as needed. The packet analysis device 213 judges whether or not the answer packet from the access point 100 is transmitted after the confirmation packet is transmitted in the process related to the step S14 (step B15). If the answer packet is not received yet, the process related to the step B15 is repeated, and the data communication in the direct link mode is continued during this period.

If the answer packet is received (the step B15: YES), the packet analysis device 213 analyzes the content of the answer packet to specify the free band of the wireless communication system 10, and transfers it to the protocol processing device 211. The protocol processing device 211 judges whether or not the direct link mode can be normally cancelled, on the basis of the free band and the communication band used for the data communication with the station 300 (step B16).

Here, whether or not the direct link mode can be normally cancelled typically indicates whether or not the free band of the wireless communication system 10 is equal to or greater than the communication band currently used for the data communication between the station 200 and the station 300. The communication band used for the data communication in the direct link mode does not necessarily correspond to the communication band assigned by the access point 100. In some cases, the access point 100 side does not recognize what degree of communication band is actually used for the data communication in the direct link mode. Therefore, in the embodiment, it is judged on the station 200 side whether or not to cancel the direct link mode.

If it is judged that the direct link mode cannot be cancelled (the step B16: NO), the process is returned to be the step B13 again, and the series of processes related to the step S13 to the step S16 is repeated. That is, even if the cancellation condition is satisfied, if the free band of the wireless communication system 10 is insufficient, the data communication in the direct link mode is continued.

On the other hand, if it is judged that the direct link mode can be cancelled (the step B16: YES), the packet generation device 212 generates the cancellation request packet indicating to instruct the cancellation of the direct link mode (i.e. one example of the "cancellation instruction information" of the present invention). The generated cancellation request packet is transmitted to the access point 100 through the communication device 230 (step B17).

In the access point 100, as described above, the presence or absence of the confirmation packet and the cancellation request packet is repeatedly judged. Here, if the cancellation request packet is transmitted from the station 200, it is judged that there is the cancellation request packet in the step A14 (the step A14: YES), and the direct link mode between the station 200 and the station 300 is canceled by the protocol processing device 111 (step A15). Specifically, the direct link mode is changed to the normal mode, and the communication band required for the normal mode is assigned to the data communication. If the direct link mode is cancelled, a cancellation completion notice packet is generated by the packet generation device 112 and is transmitted to the station 200 through the communication device 140 (step A16).

In the station 200, after the cancellation request packet is transmitted, it is judged whether or not the direct link mode is cancelled (step B18). The judgment is performed on the basis of whether or not the cancellation completion notice packet transmitted from the access point 100 is received. In the period when it is judged that the direct link mode is not cancelled (the step B18: NO), the process is in a standby state. If it is judged that the cancellation is completed (the step S18: YES), the protocol processing device 211 starts the data communication in the normal mode (step B19).

As explained above, in the embodiment, the direct link mode performed between the station 200 and the station 300 is cancelled only if the cancellation condition is satisfied and the wireless communication system 10 has the free band enough to cancel the direct link mode. Therefore, although the free band is insufficient, the direct link mode is cancelled, which prevents the quality of the data communication to be significantly deteriorated. That is, it is possible to comfortably perform the data communication in the direct link mode.

Incidentally, as described above, if it is judged that the direct link mode cannot be cancelled (the step B16: NO), the data communication in the direct link mode is continued. However, because it is originally in the communication environment which satisfies the cancellation condition, even if the data communication in the direct link mode is continued, the data communication is possibly suddenly interrupted. In case of such a situation, the protocol processing device 211 may alert or notify the user of the station 200 to or of the fact that the direct link mode cannot be cancelled because of the lack of the communication band. In this case, the user of the station 200 can recognize such a communication state that the data communication is possibly interrupted, which avoids giving an impression that the data communication is suddenly interrupted to at least the user. Alternatively, it is also possible to take measures in advance in case the data communication is interrupted. Moreover, considering that it is known whether or not there is the communication band in which the direct link mode can be cancelled, if there is no other choice but to cancel the direct link mode with the lack of the communication band, it is possible to notice or alert the user of or to the possibility that the data communication is not normally performed because of the lack of the communication band. In any cases, as described in the embodiment, it is possible to avoid the occurrence of the situation that the data communication is suddenly interrupted, by specifying the communication band available in the wireless communication system 10.

Incidentally, considering that the access point 100 cancels the direct link mode if receiving the cancellation request packet, for example, when the cancellation of the direct link mode is forcibly demanded through an input device, such as a keyboard, by the user of the station 200, the direction mode can be cancelled with or without the free band.

Second Embodiment

In the first embodiment, the free band is confirmed if the direct link mode is to be cancelled however, the direct link mode can be preferably cancelled in another method by specifying the free band in the access point 100. Now, with reference to FIG. 6, an explanation is given on another method of cancelling the direct link mode, as a second embodiment of the present invention. FIG. 6 is another timing chart showing a flow of operations from the start to the end of the direct link mode, with regard to the access point 100 and the station 200. Incidentally, in FIG. 6, the same points as those in FIG. 5 carry the same numerical references and the explanation thereof will be omitted.

In FIG. 6, in the station 200, a reservation packet (i.e. one example of the "reservation request information" of the present invention) indicating to request the reservation of the communication band, required to change the direct link mode between the station 200 and the station 300 to the normal mode (i.e. one example of the "communication band for change" of the present invention), is generated by the packet generation device 212 during the data communication in the direct link mode. The reservation packet is transmitted to the access point 100 through the communication device 230 (step D10). That is, in the second embodiment, the packet generation device 2112 also functions as one example of the "reservation request information generating device" of the present invention.

In the access point 100, after the process of starting the direct link mode is ended, it is judged by the packet analysis device 113 whether or not there is the reservation packet (step C10). If there is no reservation packet (the step C10: NO), the presence or absence of the cancellation request packet is judged as in the first embodiment (the step A14). If there is no cancellation request packet, the process is returned to the step C10 again.

If the reservation packet is received (the step C10: YES), the packet analysis device 113 transmits the fact that the reservation of the band is requested, to the band management device 130, and along with that, the band management device 130 firstly specifies the free band (the step A12). If the free band is specified, the band management device 130 performs the process of reserving the communication band whose reservation is requested from the free band. That is, the band management device 130 also functions as one example of the "band reserving device" of the present invention.

The protocol processing device 111 judges whether or not the reservation of the band is completed by the band management device 130 (step C11). If the reservation of the band is not completed (the step C11: NO), the process related to the step C11 is repeated, and the process is in a standby state until the reservation of the band is completed. On the other hand, if the reservation of the communication band is completed (the step C11: YES), a reservation completion notice packet indicating that the reservation of the communication band is completed (i.e. one example of the "reservation completion information" of the present invention) is generated by the packet generation device 112 and is transmitted to the station 200 through the communication device 140 (step C12). That is, in the second embodiment, the packet generation device 112 also functions as one example of the "reservation completion information generating device" of the present invention.

In the station 200, after the reservation packet is transmitted, it is judged whether or not the cancellation condition is satisfied (the step B13). If the cancellation condition is satisfied, it is judged by the protocol processing device 211 whether or not the communication band enough to cancel the direct link mode is already reserved (step D11). Here, if the reservation completion notice packet is not transmitted from the access point 100, it is judged that the communication band is not reserved (the step D11: NO), and the process related to the step D11 is repeated. If the communication device 230 receives the reservation completion notice packet (the step D11: YES), the cancellation request packet is generated by the packet generation device 212 and is transmitted to the access point 100 through the communication device 230 (the step B17). The processes after the cancellation request packet is transmitted are the same as those in the first embodiment. Incidentally, the generation of the cancellation request packet itself may be performed when the cancellation condition is satisfied, with or without the reservation completion notice packet.

As explained above, according to the method of cancelling the direct link mode in the second embodiment of the present invention, the communication band required in the cancellation of the direct link mode is reserved during the data communication in the direct link mode. Therefore, it is possible to normally cancel the direct link mode, and it is possible to quickly cancel the direct link mode if the cancellation condition is actually satisfied, which are preferable.

Third Embodiment

Incidentally, the direct link mode may be preferably cancelled in another method. Now, with reference to FIG. 7, an explanation is given on another method of cancelling the direct link mode, as a third embodiment of the present invention. FIG. 7 is another timing chart showing a flow of operations from the start to the end of the direct link mode, with regard to the access point 100 and the station 200. Incidentally, in FIG. 7, the same points as those in FIG. 5 carry the same numerical references and the explanation thereof will be omitted.

In FIG. 7, in the access point 100, the presence or absence of the cancellation request packet is judged after the process of starting the direct link mode (the step A14). If there is no cancellation request packet, the process related to the step A14 is repeated, and the access point 100 is in a standby state with regard to the cancellation of the direct link mode.

On the other hand, if the cancellation request packet is received (the step A14: YES), the band management device 130 specifies the free band (the step A12). The protocol processing device 111 judges whether or not the data communication in the direct link mode between the station 200 and the station 300 can be changed to the data communication in the normal mode, on the basis of the specified free band (step E10). That is, in the third embodiment, the protocol processing device 111 also functions as one example of the "base station side cancellation determining device" of the present invention.

If it is judged that the direct link mode can be cancelled (the step E10: YES), the protocol processing device 111 cancels the direct link mode (the step A15), and the cancellation completion notice packet is transmitted to the station 200 (the step A16). Moreover, even on the station 200 side, as explained above, as soon as the cancellation is judged to be completed (the step B18: YES), the data communication in the normal mode is started (the step B19).

On the other hand, in the process related to the step E10 in the access point 100, if it is judged that the direct link mode cannot be cancelled (the step E10: NO), the packet generation device 112 generates a cancellation prohibiting notice packet indicating to prohibit the cancellation of the direct link mode (i.e. one example of the "cancellation prohibiting information" of the present invention). That is, in the third embodiment, the packet generation device 112 also functions as one example of the "cancellation prohibiting information generating device" of the present invention. The generated cancellation prohibiting notice packet is transmitted to the station 200 through the communication device 140 (step E11).

In the step B18 in the station 200, if it is judged that the cancellation is not completed (the step B18: NO), the process is shifted to a step F10. In the step F10, it is judged whether or not the reason of the incompletion of the cancellation is the prohibition of the cancellation. Here, if the cancellation prohibiting notice packet is not transmitted from the access point 100, it is judged that the cancellation is not prohibited (the step F10: NO), the process is returned to the step B18 again, and it is repeatedly whether or not the cancellation is completed. On the other hand, if the reason of the incompletion of the cancellation is the prohibition of the cancellation in the access point 100 in the access point 100 (the step F10: YES), the process is returned to the step B13. In the step B13, if the cancellation condition is still satisfied, the cancellation request packet is transmitted again.

As explained above, according to the method of cancelling the direct link mode in the third embodiment of the present invention, it is judged in the access point 100 whether or not the direct link mode is cancelled. Therefore, if the communication band of the wireless communication system 10 is not used much and if there is the enough free band, then the direct link mode is cancelled by simply responding to the cancellation request packet and further packet exchange does not occur between the access point 100 and the station 200. That is, in addition to normally cancelling the direct link mode, it is possible to efficiently use the communication band, which allows the comfortable execution of the direct link mode.

The present invention is not limited to the aforementioned embodiments, and various changes and modifications can be made without departing from the essence or spirit of the invention which can be read from the claims and the entire specification. A base station apparatus for a wireless communication system, a terminal apparatus for a wireless communication system, a wireless communication system, and a method of canceling a direct link mode, which involve such changes, are also intended to be within the technical scope of the present invention.

Industrial Applicability

The base station apparatus for a wireless communication system, the terminal apparatus for a wireless communication system, the wireless communication system, and the method of canceling a direct link mode can be applied to a base station apparatus for a wireless communication system, a terminal apparatus for a wireless communication system, a wireless communication system, and a method of canceling a direct link mode which enable the comfortable data communication in the direct link mode, such as a wireless LAN.

The invention claimed is:

1. A base station apparatus for a wireless communication system, provided for a wireless communication system, which includes a plurality of terminal apparatuses capable of wirelessly performing data communication between said terminal apparatuses, which has a plurality of communication modes related to the data communication, and which includes a direct link mode (i) directly performed between said terminal apparatuses and (ii) having a required communication band smaller than that of another communication mode, as one of the communication modes, said base station apparatus comprising:
   a specifying device for specifying an available communication band from the communication band of the wireless communication system;
   a band information generating device for generating band information indicating the available communication band;
   a base-station-side wireless communicating device for transmitting the band information to at least one portion of the plurality of terminal apparatuses; and
   a cancelling device for cancelling the direct link mode by changing the direct link mode to the another communication mode in response to cancellation instruction information indicating to instruct the cancellation of the direct link mode, the direct link mode being associated with said terminal apparatus which is a transmission source of the cancellation instruction information, the cancellation instruction information being generated if a predetermined cancellation condition determined in advance as a condition to cancel the direct link mode is satisfied on each of the plurality of terminal apparatuses, the cancellation instruction information being transmitted through a terminal-side wireless communicating device provided for each of said terminal apparatuses,
   said base-station-side wireless communicating device transmits the band information to said terminal apparatus which is a transmission destination of notice request information in response to the notice request information indicating to request the notice of the available communication band, the notice request information being generated if the cancellation condition is satisfied on each of the plurality of terminal apparatuses, the notice request information being transmitted through the terminal-side wireless communicating device, and
   said cancelling device cancels the direct link mode related to said terminal apparatus which is a transmission source of cancel instruction information, in response to the cancel instruction information, which is transmitted through the terminal-side wireless communicating device if it is determined to cancel the direct link mode as a result of the judgment of whether or not to cancel the direct link mode, based on the band information on said terminal apparatus which is a transmission destination of the band information.

2. A base station apparatus for a wireless communication system, provided for a wireless communication system, which includes a plurality of terminal apparatuses capable of wirelessly performing data communication between said terminal apparatuses, which has a plurality of communication modes related to the data communication, and which includes a direct link mode (i) directly performed between said terminal apparatuses and (ii) having a required communication band smaller than that of another communication mode, as one of the communication modes, said base station apparatus comprising:
   a specifying device for specifying an available communication band from the communication band of the wireless communication system;
   a base-station-side cancellation determining device for determining whether or not to cancel the direct link mode on the basis of the available communication band, in response to cancellation instruction information indicating to instruct the cancellation of the direct link mode, the cancellation instruction information being generated if a predetermined cancellation condition determined in advance as a condition to cancel the direct link mode is satisfied on each of the plurality of terminal apparatuses, the cancellation instruction information being transmitted through a terminal-side wireless communicating device provided for each of said terminal apparatuses;
   a cancelling device for cancelling the direct link mode by changing the direct link mode to the another communication mode if it is determined to cancel the direct link mode;
   a cancellation prohibiting information generating device for generating cancellation prohibiting information indicating to prohibit the cancellation of the direct link mode if it is determined not to cancel the direct link mode by said base-station-side cancellation determining device; and
   a base-station-side wireless communicating device for transmitting the cancellation prohibiting information to said terminal apparatus which is a transmission source of the cancellation prohibiting information.

3. A terminal apparatus for a wireless communication system, capable of wirelessly performing data communication between another terminal apparatus for a wireless communication system and being provided with the another terminal apparatus for a wireless communication system and a base station apparatus in a wireless communication system, which has a plurality of communication modes related to the data communication and which includes a direct link mode (i) directly performed between said terminal apparatuses and (ii) having a required communication band smaller than that of another communication mode, said base station apparatus capable of cancelling the direct link mode by changing the direct link mode to the another communication mode, said terminal apparatus comprising:

a cancellation instruction information generating device for generating cancellation instruction information indicating to instruct the cancellation of the direct link mode if a predetermined cancellation condition determined in advance as a condition to cancel the direct link mode is satisfied;

a terminal-side cancellation determining device for determining whether or not to cancel the direct link mode, on the basis of band information indicating an available communication band from the communication band of the wireless communication system, the band information being generated on said base station apparatus, the band information being transmitted through a base-station-side wireless communicating device provided for said base station apparatus; and a terminal-side wireless communicating device for transmitting the cancellation instruction information to said base station apparatus if the cancellation condition is satisfied and it is determined to cancel the direct link mode by said terminal-side cancellation determining device.

4. The terminal apparatus for a wireless communication system according to claim 3, wherein said terminal apparatus further comprises a notice request information generating device for generating notice request information indicating to request the notice of the available communication band if the cancellation condition is satisfied, said terminal-side wireless communicating device transmits the notice request information to said base station apparatus, and said terminal-side cancellation determining device determines whether or not to cancel the direct link mode on the basis of the band information transmitted through said base-station-side wireless communicating device from said base station apparatus in response to the notice request information.

5. A terminal apparatus for a wireless communication system, capable of wirelessly performing data communication between another terminal apparatus for a wireless communication system and being provided with the another terminal apparatus for a wireless communication system and a base station apparatus in a wireless communication system, which has a plurality of communication modes related to the data communication and which includes a direct link mode (i) directly performed between said terminal apparatuses and (ii) having a required communication band smaller than that of another communication mode, said base station apparatus capable of cancelling the direct link mode by changing the direct link mode to the another communication mode, said terminal apparatus comprising:

a reservation request information generating device for generating reservation request information indicating to request reservation of a communication band for change required to change the direct link mode to the another communication mode if the data communication is performed in the direct link mode;

a terminal-side wireless communicating device for transmitting the reservation request information to said base station apparatus; and a cancellation instruction information generating device for generating cancellation instruction information indicating to instruct the cancellation of the direct link mode if a predetermined cancellation condition determined in advance as a condition to cancel the direct link mode is satisfied, said terminal-side wireless communicating device transmitting the reservation request information to said base station apparatus in accordance with reservation completion information indicating that the communication band for change is reserved, the reservation completion information being generated on said base station apparatus if said base station apparatus reserves the communication band for change from an available communication band of the communication band of the wireless communication system in response to the transmitted reservation request information, the reservation completion information being transmitted through a base-station-side wireless communicating device.

6. A wireless communication system, including a base station apparatus and a plurality of terminal apparatuses capable of wirelessly performing data communication between said terminal apparatuses, having a plurality of communication modes in performing the data communication, and including a direct link mode (i) directly performed between said terminal apparatuses and (ii) having a required communication band smaller than that of another communication mode, as one of the communication modes, said base station apparatus comprising:

a specifying device for specifying an available communication band from the communication band of the wireless communication system;

a band information generating device for generating band information indicating the available communication band; and a base-station-side wireless communicating device for transmitting the band information to at least one portion of the plurality of terminal apparatuses, each of said plurality of terminal apparatuses comprising:

a cancellation instruction information generating device for generating cancellation instruction information indicating to instruct the cancellation of the direct link mode if a predetermined cancellation condition determined in advance as a condition to cancel the direct link mode is satisfied;

a terminal-side cancellation determining device for determining whether or not to cancel the direct link mode, on the basis of the transmitted band information; and a terminal-side wireless communicating device for transmitting the cancellation instruction information to said base station apparatus if the cancellation condition is satisfied and it is determined to cancel the direct link mode by said terminal-side cancellation determining device, said base station apparatus further comprising a cancelling device for cancelling the direct link mode by changing the direct link mode to the another communication mode in response to the transmitted cancellation instruction information, the direct link mode being associated with said terminal apparatus which is a transmission source of the cancellation instruction information.

7. A wireless communication system, including a base station apparatus and a plurality of terminal apparatuses capable of wirelessly performing data communication between said terminal apparatuses, having a plurality of communication modes in performing the data communication, and including a direct link mode (i) directly performed between said terminal apparatuses and (ii) having a required communication band smaller than that of another communication mode, as one of the communication modes, each of said plurality of terminal apparatuses comprising:

a reservation request information generating device for generating reservation request information indicating to request reservation of a communication band for change required to change the direct link mode to the another communication mode if the data communication is performed in the direct link mode;

a terminal-side wireless communicating device for transmitting the reservation request information to said base station apparatus; and a cancellation instruction information generating device for generating cancellation instruction information indicating to instruct the cancellation of the direct link mode if a predetermined cancellation condition determined in advance as a condition to cancel the direct link mode is satisfied, said base station apparatus comprising:

a specifying device for specifying an available communication band from the communication band of the wireless communication system;

a band reserving device for reserving a communication band for change from the available communication band in response to the transmitted reservation request information;

a reservation completion information generating device for generating reservation completion information indicating the communication band for change is reserved when the communication band for change is reserved; and a base-station-side wireless communicating device for transmitting the reservation completion information to said terminal apparatus which is a transmission destination of the reservation completion information, said terminal-side wireless communicating device transmitting the cancellation instruction information to said base station apparatus in response to the transmitted reservation completion information, said base station apparatus further comprising a cancelling device for cancelling the direct link mode by changing the direct link mode to the another communication mode by using the reserved communication band for change, in response to the transmitted cancellation instruction information.

8. A wireless communication system, including a base station apparatus and a plurality of terminal apparatuses capable of wirelessly performing data communication between said terminal apparatuses, having a plurality of communication modes in performing the data communication, and including a direct link mode (i) directly performed between said terminal apparatuses and (ii) having a required communication band smaller than that of another communication mode, as one of the communication modes, each of said plurality of terminal apparatuses comprising:

a cancellation instruction information generating device for generating cancellation instruction information indicating to instruct the cancellation of the direct link mode if a predetermined cancellation condition determined in advance as a condition to cancel the direct link mode is satisfied; and a terminal-side wireless communicating device for transmitting the cancellation instruction information to said base station apparatus, said base station apparatus comprising:

a specifying device for specifying an available communication band from the communication band of the wireless communication system;

a base-station-side cancellation determining device for determining whether or not to cancel the direct link mode on the basis of the available communication band, in response to the transmitted cancellation instruction information;

a cancellation prohibiting information generating device for generating cancellation prohibiting information indicating to prohibit the cancellation of the direct link mode if it is determined not to cancel the direct link mode by said base-station-side cancellation determining device;

a base-station-side wireless communicating device for transmitting the cancellation prohibiting information to said terminal apparatus which is a transmission source of the cancellation prohibiting information; and a cancelling device for cancelling the direct link mode by changing the direct link mode to the another communication mode if it is determined to cancel the direct link mode by said base-station-side cancellation determining device.

9. A method of cancelling a direct link mode in a wireless communication system, including a base station apparatus and a plurality of terminal apparatuses capable of wirelessly performing data communication between said terminal apparatuses, having a plurality of communication modes in performing the data communication, and including the direct link mode (i) directly performed between said terminal apparatuses and (ii) having a required communication band smaller than that of another communication mode, as one of the communication modes, said method comprising, in said base station apparatus:

a specifying process of specifying an available communication band from the communication band of the wireless communication system;

a band information generating process of generating band information indicating the available communication band; and a first transmitting process of transmitting the band information to at least one portion of the plurality of terminal apparatuses, said method comprising, in each of said plurality of terminal apparatuses:

a cancellation instruction information generating process of generating cancellation instruction information indicating to instruct the cancellation of the direct link mode if a predetermined cancellation condition determined in advance as a condition to cancel the direct link mode is satisfied;

a terminal-side cancellation determining process of determining whether or not to cancel the direct link mode, on the basis of the transmitted band information; and a second transmitting process of transmitting the cancellation instruction information to said base station apparatus if the cancellation condition is satisfied and it is determined to cancel the direct link mode by said terminal-side cancellation determining process, said method further comprising, in said base station apparatus, a cancelling process of cancelling the direct link mode by changing the direct link mode to the another communication mode in response to the transmitted cancellation instruction information, the direct link mode being associated with said terminal apparatus which is a transmission source of the cancellation instruction information.

10. A method of cancelling a direct link mode in a wireless communication system, including a base station apparatus and a plurality of terminal apparatuses capable of wirelessly performing data communication between said terminal apparatuses, having a plurality of communication modes in performing the data communication, and including the direct link mode (i) directly performed between said terminal apparatuses and (ii) having a required communication band smaller than that of another communication mode, as one of the communication modes, said method comprising, in each of said plurality of terminal apparatuses:

a reservation request information generating process of generating reservation request information indicating to request reservation of a communication band for change required to change the direct link mode to the another communication mode if the data communication is performed in the direct link mode;

a first transmitting process of transmitting the reservation request information to said base station apparatus; and a cancellation instruction information generating process of generating cancellation instruction information indicating to instruct the cancellation of the direct link mode if a predetermined cancellation condition determined in advance as a condition to cancel the direct link mode is satisfied, said method comprising, in said base station apparatus:

a specifying process of specifying an available communication band from the communication band of the wireless communication system;

a band reserving process of reserving a communication band for change from the available communication band in response to the transmitted reservation request information;

a reservation completion information generating process of generating reservation completion information indicating the communication band for change is reserved when the communication band for change is reserved; and a second transmitting process of transmitting the reservation completion information to said terminal apparatus which is a transmission destination of the reservation completion information, said method further comprising, in said terminal apparatus, a third transmitting process of transmitting the cancellation instruction information to said base station apparatus in response to the transmitted reservation completion information, said method further comprising, in said base station apparatus, a cancelling process of cancelling the direct link mode by changing the direct link mode to the another communication mode by using the reserved communication band for change, in response to the transmitted cancellation instruction information.

11. A method of cancelling a direct link mode in a wireless communication system, including a base station apparatus and a plurality of terminal apparatuses capable of wirelessly performing data communication between said terminal apparatuses, having a plurality of communication modes in performing the data communication, and including the direct link mode (i) directly performed between said terminal apparatuses and (ii) having a required communication band smaller than that of another communication mode, as one of the communication modes, said method comprising, in each of said plurality of terminal apparatuses:

a cancellation instruction information generating process of generating cancellation instruction information indicating to instruct the cancellation of the direct link mode if a predetermined cancellation condition determined in advance as a condition to cancel the direct link mode is satisfied; and a first transmitting process of transmitting the cancellation instruction information to said base station apparatus, said method comprising, in said base station apparatus:

a specifying process of specifying an available communication band from the communication band of the wireless communication system;

a base-station-side cancellation determining process of determining whether or not to cancel the direct link mode on the basis of the available communication band, in response to the transmitted cancellation instruction information;

a cancellation prohibiting information generating process of generating cancellation prohibiting information indicating to prohibit the cancellation of the direct link mode if it is determined not to cancel the direct link mode by said base-station-side cancellation determining process;

a second transmitting process of transmitting the cancellation prohibiting information to said terminal apparatus which is a transmission source of the cancellation prohibiting information; and a cancelling process of cancelling the direct link mode by changing the direct link mode to the another communication mode if it is determined to cancel the direct link mode by said base-station-side cancellation determining process.

* * * * *